United States Patent
Shiotani et al.

(10) Patent No.: US 11,394,162 B2
(45) Date of Patent: Jul. 19, 2022

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yoshihiro Shiotani, Inukami-gun (JP); Yoji Tajiri, Inukami-gun (JP); Hayato Arakawa, Inukami-gun (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 0 days.

(21) Appl. No.: 17/218,169

(22) Filed: Mar. 31, 2021

(65) Prior Publication Data

US 2021/0218209 A1 Jul. 15, 2021

Related U.S. Application Data

(63) Continuation of application No. PCT/JP2019/039169, filed on Oct. 3, 2019.

(30) Foreign Application Priority Data

Oct. 17, 2018 (JP) .............................. JP2018-195817

(51) Int. Cl.
*H01R 3/00* (2006.01)
*H01R 35/02* (2006.01)
(Continued)

(52) U.S. Cl.
CPC ........... *H01R 35/025* (2013.01); *H02G 11/00* (2013.01); *B60R 16/027* (2013.01)

(58) Field of Classification Search
CPC .......................... H01R 35/025; B06R 16/027
See application file for complete search history.

(56) References Cited

U.S. PATENT DOCUMENTS

| 4,836,795 A * | 6/1989 | Schauer ................. H02G 11/00 439/15 |
| 5,046,951 A * | 9/1991 | Suzuki .................. B60R 16/027 439/15 |

(Continued)

FOREIGN PATENT DOCUMENTS

| CN | 103378526 | 10/2013 |
| CN | 204304183 U | 4/2015 |

(Continued)

OTHER PUBLICATIONS

Chinese Office Action for corresponding CN Application No. 201980062817.2, dated Feb. 14, 2022 (w/English machine translation).

(Continued)

*Primary Examiner* — Phuong Chi Thi Nguyen
(74) *Attorney, Agent, or Firm* — Mori & Ward, LLP

(57) ABSTRACT

A rotary connector device includes a fixed body, a rotation body, and a connector. The rotation body is rotatable about a rotation axis with respect to the fixed body. The rotation body is assembled to the fixed body in a manner to form a first space between the rotation body and the fixed body. The connector includes a second space. The connector includes a first opening and a second opening. One end of a first cable is connected to a first electrode provided in the second space. One end of a second cable is connected to a second electrode provided in the second space. The first cable passes through the first opening. The other end of the first cable is connected to the rotation body. The second cable passes through the (Continued)

second opening. The other end of the second cable is connected to the rotation body.

6 Claims, 10 Drawing Sheets

(51) Int. Cl.
  *H02G 11/00* (2006.01)
  *B60R 16/027* (2006.01)

(56) References Cited

U.S. PATENT DOCUMENTS

| | | | |
|---|---|---|---|
| 5,226,230 A * | 7/1993 | Klinger | B25B 27/10 |
| | | | 285/308 |
| 5,429,517 A | 7/1995 | Bolen | |
| 6,007,355 A * | 12/1999 | Shibata | B60R 16/027 |
| | | | 439/15 |
| 6,343,946 B1 | 2/2002 | Matsumoto | |
| 7,190,385 B2 * | 3/2007 | Van Uffel | B41J 2/365 |
| | | | 347/188 |
| 9,011,162 B2 | 4/2015 | Sato et al. | |
| 2007/0184693 A1 | 8/2007 | Mitsui | |
| 2013/0344706 A1 | 12/2013 | Sato et al. | |

FOREIGN PATENT DOCUMENTS

| | | |
|---|---|---|
| CN | 204304185 U | 4/2015 |
| CN | 106159621 | 11/2016 |
| CN | 107342518 | 11/2017 |
| CN | 107887768 | 4/2018 |
| JP | H07-263103 | 10/1995 |
| JP | 2000-306649 | 11/2000 |
| JP | 2001-28286 | 1/2001 |
| JP | 2007-213958 | 8/2007 |
| JP | 2008-029179 | 2/2008 |
| JP | 2012-204057 | 10/2012 |
| JP | 2014-006986 | 1/2014 |
| JP | 2017-199594 | 11/2017 |

OTHER PUBLICATIONS

Extended European Search Report for corresponding EP Application No. 19874314.8-1201, dated Oct. 19, 2021.
Written Opinion for corresponding International Application No. PCT/JP2019/039169, dated Nov. 12, 2019.
International Search Report for corresponding International Application No. PCT/JP2019/039169, dated Nov. 12, 2019.

* cited by examiner

ROTARY CONNECTOR DEVICE

CROSS-REFERENCE TO RELATED APPLICATIONS

The present application is a continuation application of International Application No. PCT/JP2019/039169, filed Oct. 3, 2019, which claims priority to Japanese Patent Application No. 2018-195817 filed Oct. 17, 2018. The contents of these applications are incorporated herein by reference in their entirety.

BACKGROUND

Technical Field

The technology disclosed in the present application relates to a rotary connector device.

Background Art

A rotary connector device in which a flat cable is disposed in a housing space between a fixed body and a rotation body is known (e.g., see Japanese Unexamined Patent Application Publication No. 2012-204057).

SUMMARY

According to one aspect of the present application, a rotary connector device includes a fixed body, a rotation body, and a connector. The rotation body is rotatable about a rotation axis with respect to the fixed body. The rotation body is assembled to the fixed body in a manner to form a first space between the rotation body and the fixed body. The connector is coupled to the fixed body and includes a second space. The connector includes a first opening connecting the second space to the first space and a second opening partitioned with the first opening. The second opening connects the second space to the first space. One end of a first cable is connected to a first electrode provided in the second space of the connector. One end of a second cable is connected to a second electrode provided in the second space of the connector. The first cable passes through the first opening. The other end of the first cable is connected to the rotation body. The second cable passes through the second opening. The other end of the second cable is connected to the rotation body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Hereinafter, embodiments will be described with reference to the drawings. In the figures, the same reference signs denote corresponding or identical components.

Outline of Rotary Connector Device

Figure 1:
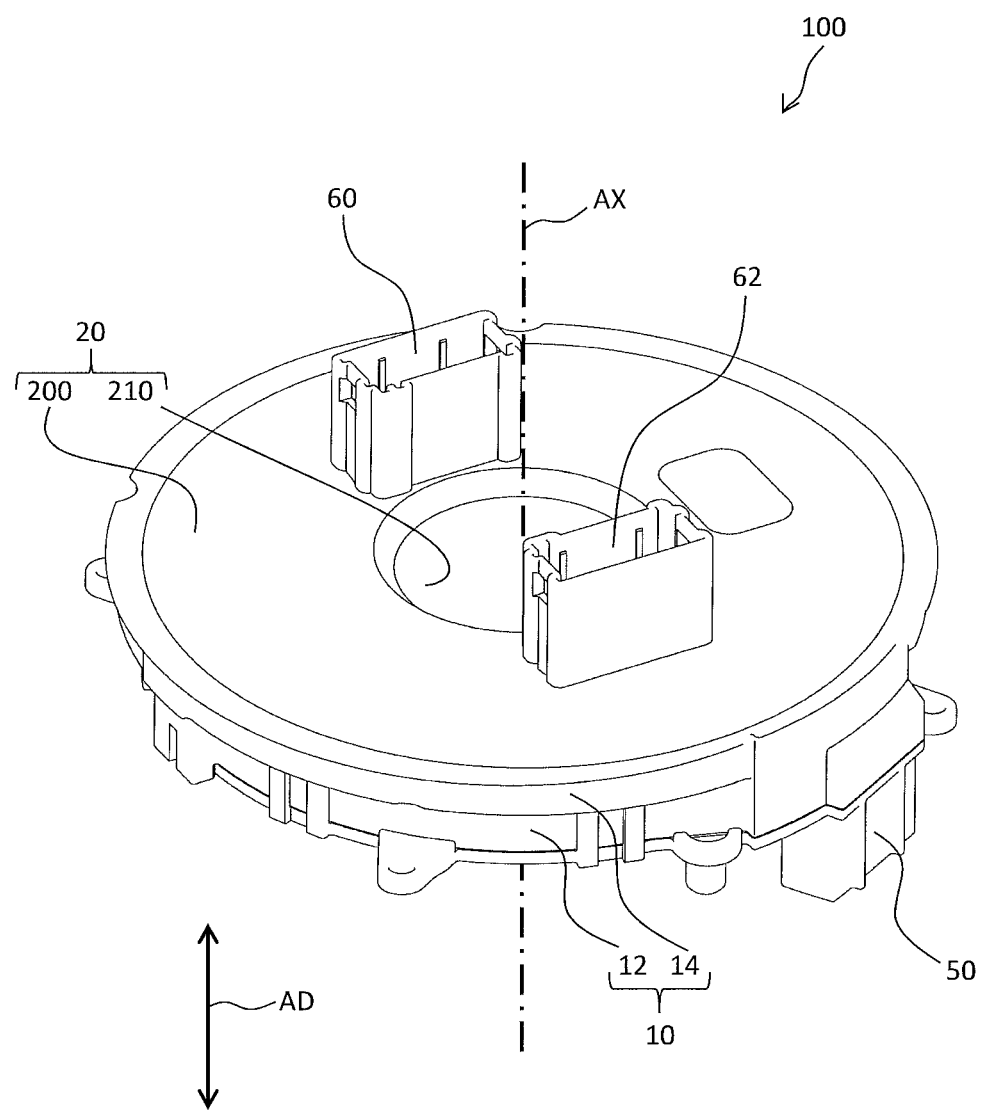
FIG. 1 is a perspective view of a rotary connector device according to an embodiment.
Figure 2:
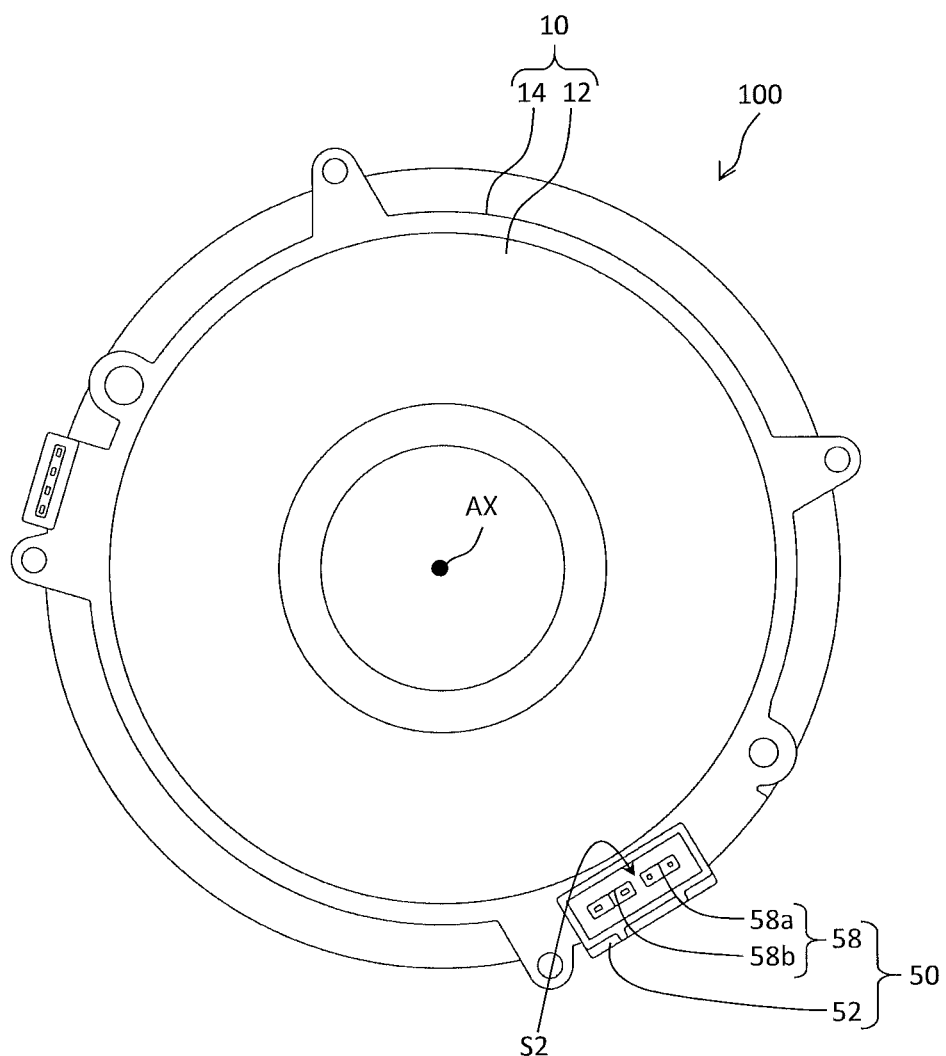
FIG. 2 is a bottom view of the rotary connector device.
Figure 3:
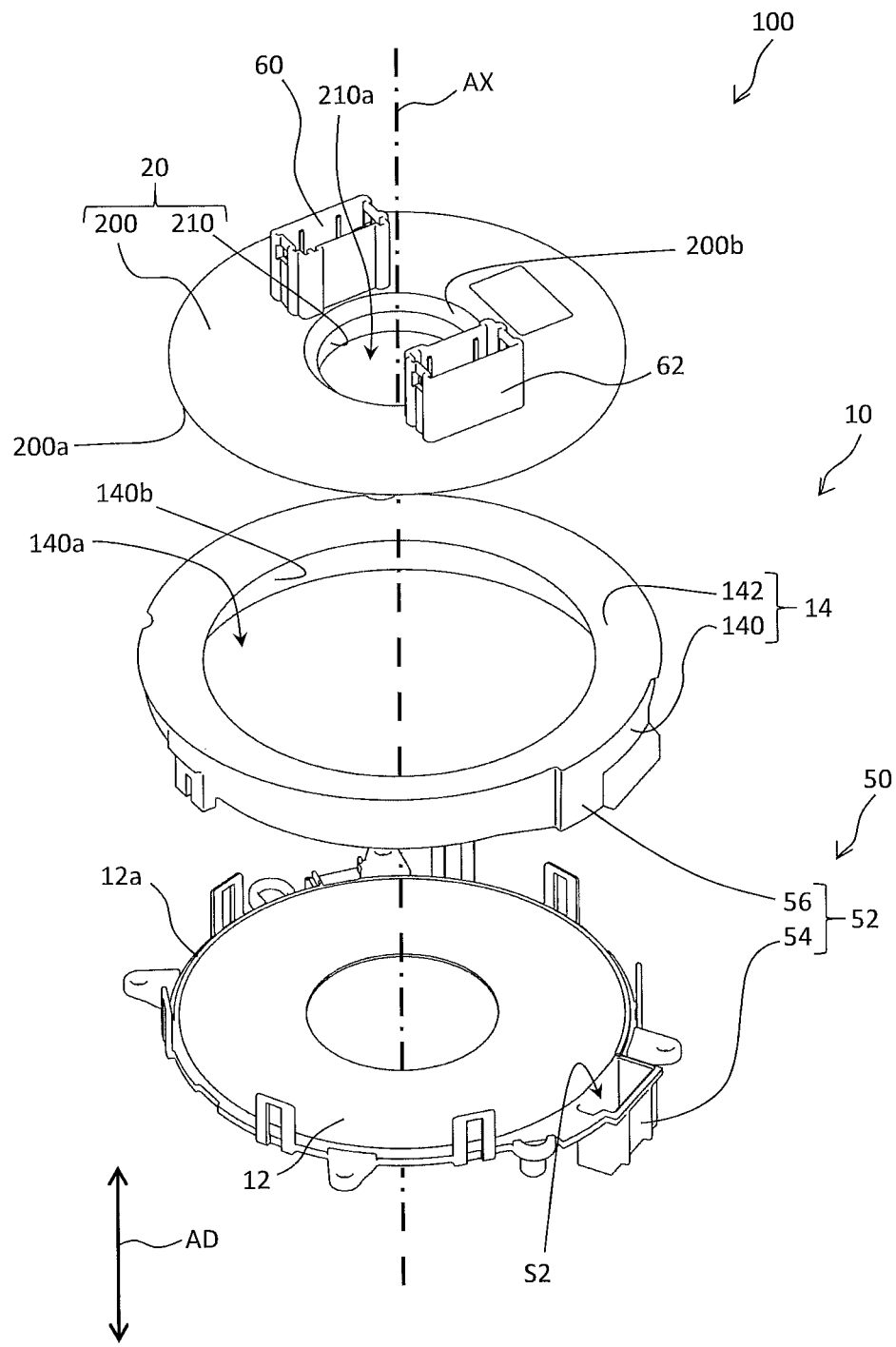
FIG. 3 is a perspective view in which a fixed body is removed from a rotation body and the fixed body is disassembled into a first fixed body portion and a second fixed body portion.
Figure 4:
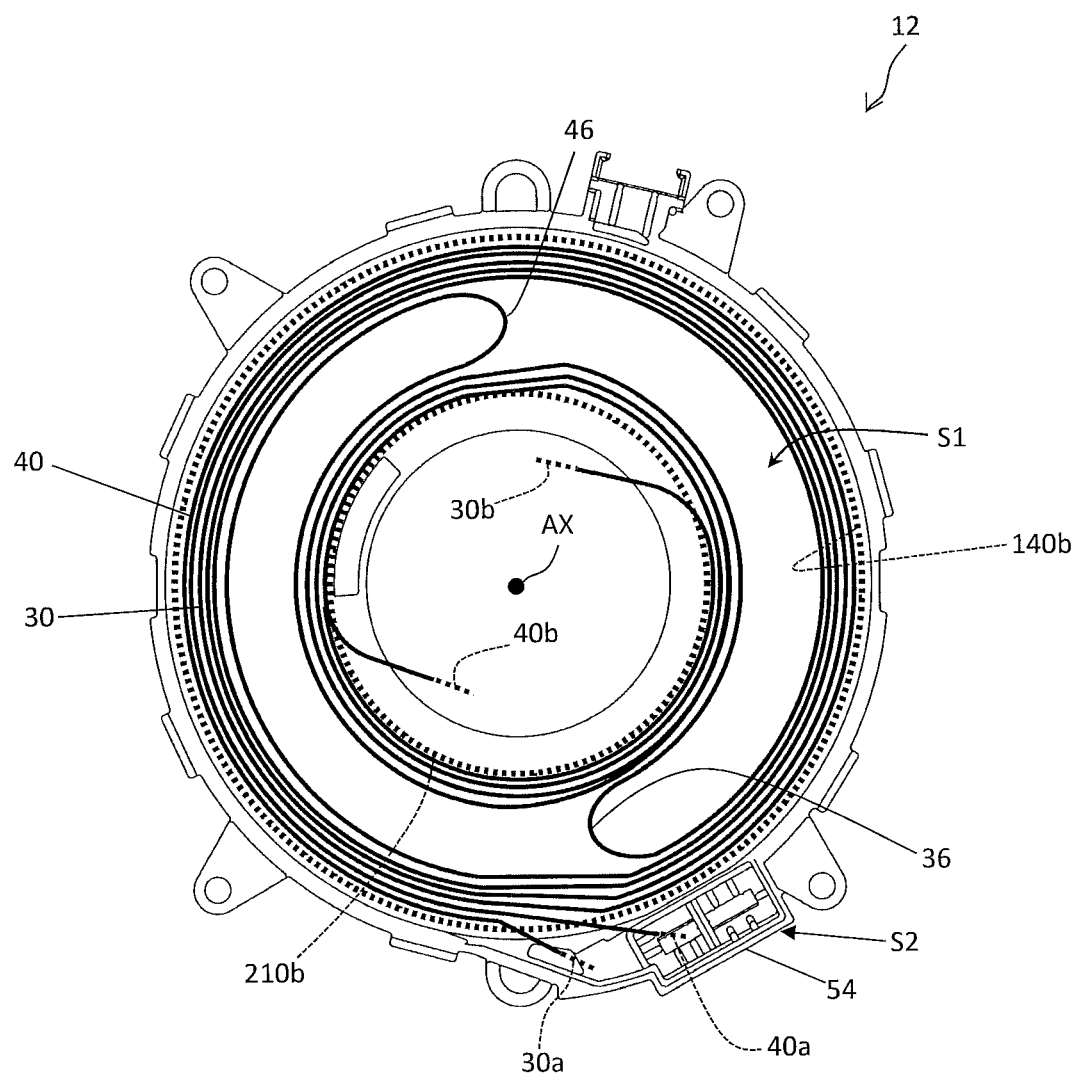
FIG. 4 is a top view of the first fixed body portion for illustrating arrangement of a plurality of cables.

FIG. 1 is a perspective view of a rotary connector device 100 according to an embodiment. FIG. 2 is a bottom view of the rotary connector device 100. FIG. 3 is a perspective view in which a fixed body 10 is removed from a rotation body 20 and the fixed body 10 is disassembled into a first fixed body portion 12 and a second fixed body portion 14. FIG. 4 is a top view of the first fixed body portion 12 for illustrating arrangement of a plurality of cables. In FIG. 4, an inner peripheral surface 140b of an outer-circumferential cylindrical portion 140 and an outer peripheral surface 210b of an inner-circumferential cylindrical portion 210 are indicated by dotted lines.

As illustrated in FIGS. 1 to 3, the rotary connector device 100 includes the fixed body 10 and the rotation body 20. The rotation body 20 is assembled to the fixed body 10 so as to be rotatable with respect to the fixed body 10 around a rotation axis AX. In a state where the rotation body 20 is assembled to the fixed body 10, a first space S1 (see FIGS. 4 and 9) is defined between the fixed body 10 and the rotation body 20.

As illustrated in FIG. 4, a first cable 30 and a second cable 40 are each disposed in the first space S1. One end 30a of the first cable 30 and one end 40a of the second cable 40 are respectively connected to the fixed body 10. The other end 30b of the first cable 30 and the other end 40b of the second cable 40 are respectively connected to the rotation body 20.

The rotary connector device 100 is used in, for example, a moving body (e.g., an automobile) including a main body and a steering portion rotatable with respect to the main body. Specifically, the fixed body 10 is attached to the main body of the moving body. The rotation body 20 is attached to a steering portion. For example, the one end 30a of the first cable 30 is electrically connected to a power source provided in the main body of the moving body. The other end 30b of the first cable 30 is electrically connected to a heater provided in the steering portion. When electric power is supplied from the power source to the heater via the first cable 30, the heater generates heat to warm the steering portion.

The one end 40a of the second cable 40 is electrically connected to a controller (e.g., an Engine Control Unit) provided in the main body of the moving body. The other end 40b of the second cable 40 is electrically connected to an airbag provided in the steering portion. A collision sensor provided in the moving body is also connected to the controller. When the controller receives a signal indicating the collision of the moving body from the collision sensor, the controller transmits a signal for opening the airbag to the airbag via the second cable 40.

However, the rotary connector device 100 may be used in a device other than the moving body, and signals and electric power transmitted by the first cable 30 and the second cable 40 are not limited to those described above. Three or more cables may be connected between the fixed body 10 and the rotation body 20.

Configuration of Fixed Body

As illustrated in FIGS. 1 and 3, the fixed body 10 includes the first fixed body portion 12 and the second fixed body portion 14. The second fixed body portion 14 is coupled to the first fixed body portion 12 in a state of being disposed on the first fixed body portion 12.

As illustrated in FIG. 3, the first fixed body portion 12 has a ring shape when the rotary connector device 100 is viewed in an axial direction AD substantially parallel to the rotation axis AX. The first fixed body portion 12 is disposed such that the rotation axis AX passes through the center of the first fixed body portion 12.

The second fixed body portion 14 includes the outer-circumferential cylindrical portion 140 and an inner flange portion 142. The outer-circumferential cylindrical portion 140 has a cylindrical shape in which a hollow portion 140a of the outer-circumferential cylindrical portion 140 extends in the axial direction AD. The outer-circumferential cylindrical portion 140 extends upward from an outer periphery 12a of the first fixed body portion 12 in the axial direction AD. The inner flange portion 142 extends from the inner peripheral surface 140b of the outer-circumferential cylindrical portion 140 in the radial direction of the rotation axis AX.

Configuration of Rotation Body

The rotation body 20 includes an annular member 200 and the inner-circumferential cylindrical portion 210. The annular member 200 has a ring shape when the rotary connector device 100 is viewed in the axial direction AD. The annular member 200 is disposed such that the rotation axis AX passes through the center of the annular member 200. The annular member 200 is disposed such that an edge 200a of a bottom surface of the annular member faces the inner flange portion 142 in the axial direction AD. The inner-circumferential cylindrical portion 210 is disposed such that a hollow portion 210a of the inner-circumferential cylindrical portion 210 extends in the axial direction AD. The inner-circumferential cylindrical portion 210 extends downward from an inner periphery 200b of the annular member 200 along the axial direction AD. The inner-circumferential cylindrical portion 210 is disposed inside the outer-circumferential cylindrical portion 140 having a cylindrical shape in the radial direction of the rotation axis AX. Thus, the first space S1 in which the first cable 30 and the second cable 40 are disposed is composed of the first fixed body portion 12, the outer-circumferential cylindrical portion 140, the annular member 200, and the inner-circumferential cylindrical portion 210. In other words, the first space S1 in which the first cable 30 and the second cable 40 are disposed is equal to a space obtained by excluding the hollow portion 210a of the inner-circumferential cylindrical portion 210 from the hollow portion 140a of the outer-circumferential cylindrical portion 140.

In the present embodiment, the inner-circumferential cylindrical portion 210 is provided in the rotation body 20. However, in order to define the first space S1, the inner-circumferential cylindrical portion 210 may be provided in the fixed body 10. Further, in the present embodiment, the rotary connector device 100 has the shape having the hollow portion 210a, but the rotary connector device 100 may not have the hollow portion 210a.

Configuration of Cable

Figure 5:
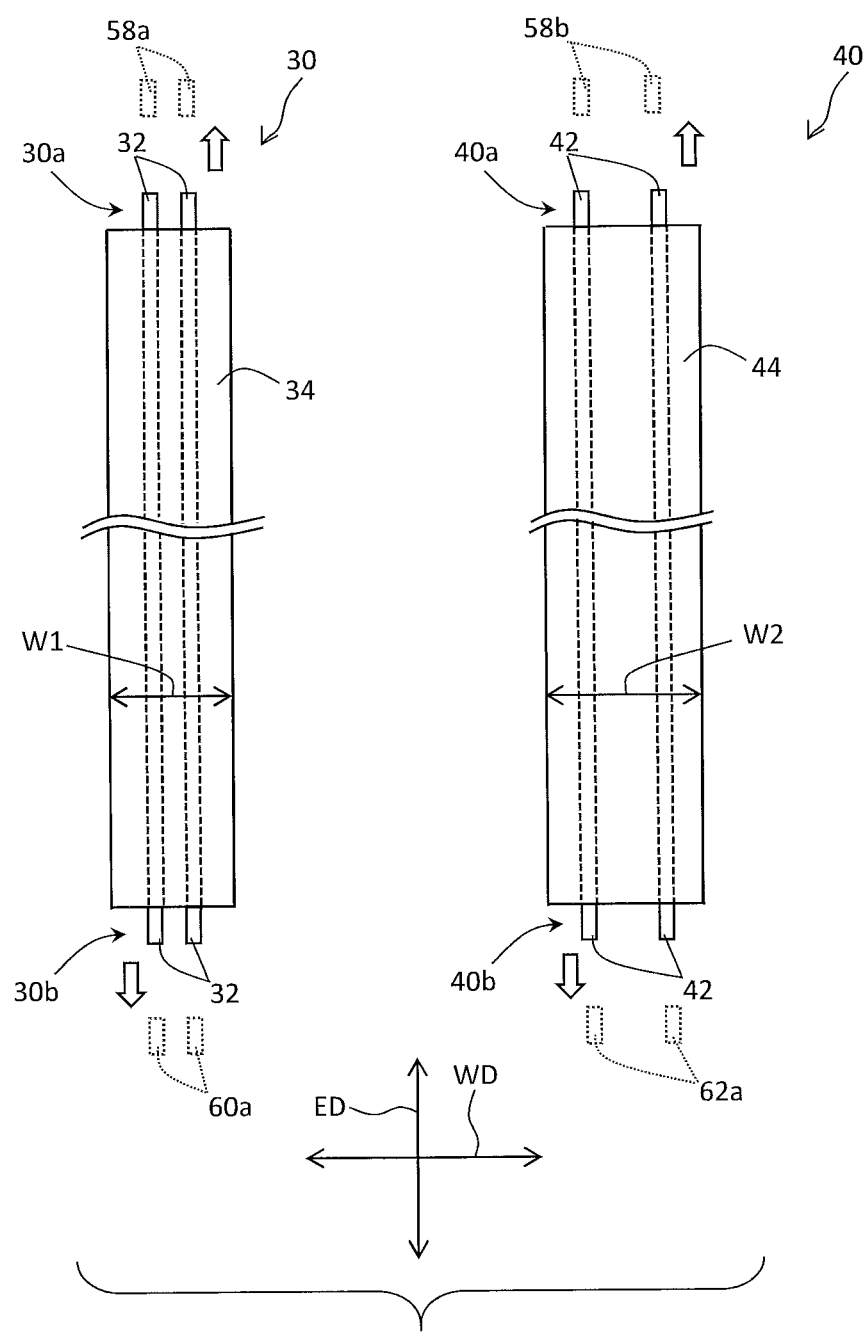
FIG. 5 is a diagram illustrating a configuration of a plurality of cables.

FIG. 5 is a diagram illustrating a configuration of the first cable 30 and the second cable 40. The first cable 30 has flexibility. The first cable 30 has a flat shape. The first cable 30 includes a conducting wire 32 and a covering member 34 covering the conducting wire 32 and having insulating properties. However, at the one end 30a and the other end 30b of the first cable 30, the conducting wire 32 is exposed from the covering member 34. As illustrated in FIG. 4, the first cable 30 is wound along the inner peripheral surface 140b of the outer-circumferential cylindrical portion 140 in the first space S1, the winding direction is reversed at a reversing portion 36, and the first cable 30 is wound along the outer peripheral surface 210b of the inner-circumferential cylindrical portion 210.

The second cable 40 has flexibility. The second cable 40 has a flat shape. The second cable 40 includes a conducting wire 42 and a covering member 44 covering the conducting wire 42 and having insulating properties. However, at the one end 40a and the other end 40b of the second cable 40, the conducting wire 42 is exposed from the covering member 44. As illustrated in FIG. 4, the second cable 40 is wound along the inner peripheral surface 140b of the outer-circumferential cylindrical portion 140 in the first space S1, the winding direction is reversed at a reversing portion 46, and the second cable 40 is wound along the outer peripheral surface 210b of the inner-circumferential cylindrical portion 210.

As illustrated in FIG. 5, a width W1 of the first cable 30 is smaller than a width W2 of the second cable 40. However, the width of the cable is the length of the cable in a width direction WD along a flat surface of the cable and substantially orthogonal to an extending direction ED in which the cable extends.

In the example illustrated in FIG. 5, two conducting wires 32 are provided in the first cable 30 and two conducting wires 42 are provided in the second cable 40, but the number of conducting wires 32 and the number of conducting wires 42 are not limited thereto.

Configuration of Connector

As illustrated in FIG. 1, the rotary connector device 100 includes a connector 50 on the fixed body 10 side, a connector 60 on the rotation body 20 side, and a connector 62 on the rotation body 20 side.

As illustrated in FIGS. 1 and 2, the connector 50 has a second space S2 inside and is coupled to the fixed body 10. The connector 50 includes a cover 52 and a plurality of electrodes 58 (see FIG. 2). As illustrated in FIG. 3, the cover 52 includes a first cover portion 54 and a second cover portion 56. As illustrated in FIG. 3, the first cover portion 54 has a cylindrical shape extending downward from a part of the outer periphery 12a of the first fixed body portion 12 in the axial direction AD. The second cover portion 56 extends outward from the outer-circumferential cylindrical portion 140 of the second fixed body portion 14 in the radial direction of the rotation axis AX. The first fixed body portion 12 and the second fixed body portion 14 are coupled to each other, and the first cover portion 54 and the second cover portion 56 are coupled to each other, thereby forming the second space S2. The second space S2 is open downward in the axial direction AD. However, the shape of the cover 52 is not limited thereto. For example, the cover 52 may have a cylindrical shape that extends outward from the outer-circumferential cylindrical portion 140 in the radial direction of the rotation axis AX and opens an internal space in the radial direction of the rotation axis AX.

As illustrated in FIG. 2, the plurality of electrodes 58 are disposed in the cover 52 in the second space S2. That is, the plurality of electrodes 58 are covered by the cover 52. Each of the plurality of electrodes 58 has a terminal portion, and the terminal portion is connected to a terminal of a cable connected to a controller provided in a main body of the moving body. However, the terminal portion may be electrically connected to the electrode 58, and the terminal portion and the electrode 58 may be provided separately.

The plurality of electrodes 58 include a first electrode 58a and a second electrode 58b. The first electrode 58a is connected to the conducting wire 32 exposed from the covering member 34 at one end 30a of the first cable 30 in the second space S2. The first electrode 58a and the conducting wire 32 are connected to each other by crimping or by bonding via solder. However, the connection between the first electrode 58a and the conducting wire 32 may be realized by other methods. The first electrode 58a is electrically connected to a power source provided in the moving body. The second electrode 58b is connected to the conducting wire 42 exposed from the covering member 44 at one end 40a of the second cable 40 in the second space S2. The second electrode 58b and the conducting wire 42 are connected to each other by crimping or by bonding via solder. However, the connection between the second electrode 58b and the conducting wire 42 may be realized by other methods. The second electrode 58b is electrically connected to a controller provided in the moving body.

The first cable 30 passes through the opening of the inner-circumferential cylindrical portion 210, and the other end 30b of the first cable 30 is connected to the connector 60. Specifically, the conducting wire 32 exposed from the covering member 34 at the other end 30b of the first cable 30 is connected to a third electrode 60a (see FIGS. 5 and 8) of the connector 60. The third electrode 60a is electrically connected to the heater of the steering portion. The second cable 40 passes through the opening of the inner-circumferential cylindrical portion 210, and the other end 40b of the second cable 40 is connected to the connector 62. Specifically, the conducting wire 42 exposed from the covering member 44 at the other end 40b of the second cable 40 is connected to a fourth electrode 62a (see FIGS. 5 and 8) of the connector 62. The fourth electrode 62a is electrically connected to an airbag provided in the steering portion.

However, the connector 60 and the connector 62 may be connected to the rotation body 20 and are not limited to the shape illustrated in the present embodiment. The connector to which the other end 30b of the first cable 30 is connected and the connector to which the other end 40b of the second cable 40 is connected may be the same.

Arrangement of Cable

Figure 6:
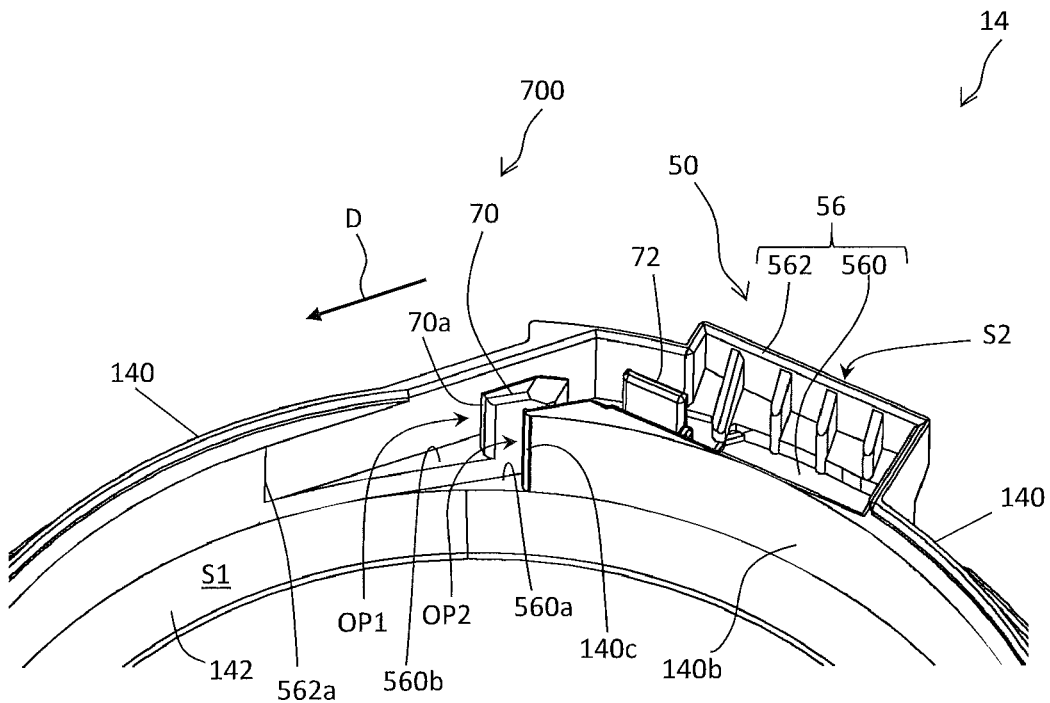
FIG. 6 is a perspective view of the second fixed body portion for illustrating a partition wall.
Figure 7:
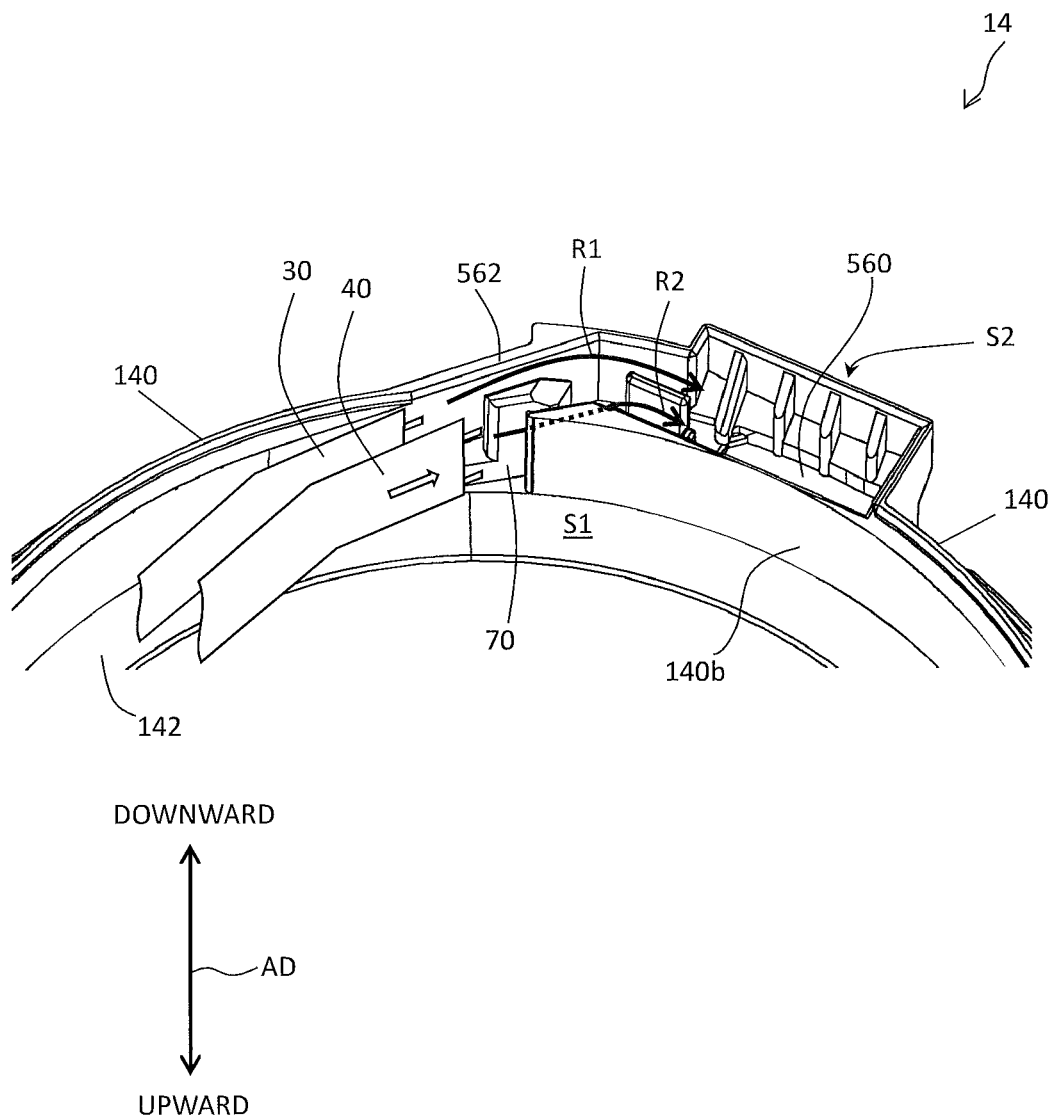
FIG. 7 is a perspective view of the second fixed body portion for illustrating a first cable passing through a first opening and a second cable passing through a second opening.

Next, the arrangement of the first cable 30 and the second cable 40 from the second space S2 to the first space S1 will be described with reference to FIGS. 6 and 7. FIG. 6 is a perspective view of the second fixed body portion 14 for illustrating a partition wall 70. FIG. 7 is a perspective view of the second fixed body portion 14 for illustrating the first cable 30 passing through a first opening OP1 and the second cable 40 passing through a second opening OP2.

As illustrated in FIG. 6, the connector 50 has the first opening OP1 and the second opening OP2 that connect the second space S2 to the first space S1, respectively. The first opening OP1 and the second opening OP2 open to the first space S1 below the inner flange portion 142 in the axial direction AD. The first opening OP1 and the second opening OP2 are partitioned by the partition wall 70. The partition wall 70 is disposed in the connector 50 in the second space S2. The partition wall 70 extends along the axial direction AD.

More specifically, the second cover portion 56 includes a first wall 560 and a second wall 562. The first wall 560 extends outward from the outer-circumferential cylindrical portion 140 in the radial direction of the rotation axis AX. The second wall 562 is connected to the first wall 560 and extends downward in the axial direction AD. The partition wall 70 extends downward from an inner surface 560a of the first wall 560 in the axial direction AD. The partition wall 70 extends in the second space S2 in a direction D orthogonal to the rotation axis AX and extending from the second space S2 toward the first space S1. In the present embodiment, the direction D is along a circumferential direction of the rotation axis AX. More precisely, when the rotary connector device 100 is viewed along the axial direction AD, the direction D is a tangential direction of the outer-circumferential cylindrical portion 140 at a connection position 562a between the second wall 562 and the outer-circumferential cylindrical portion 140.

The connector 50 further includes a partition wall 72. The partition wall 72 is provided to separate the first cable 30 and the second cable 40 from each other in a direction orthogonal to the rotation axis AX in the second space S2. The partition wall 72 is disposed in the connector 50 in the second space S2. The partition wall 72 extends downward from the inner surface 560a of the first wall 560 in the axial direction AD. The partition wall 72 is provided farther from the first space S1 than the partition wall 70. In other words, the partition wall 72 is provided closer to the plurality of electrodes 58 of the connector 50 than the partition wall 70.

Even when at least one of the first cable 30 or the second cable 40 is cut in the vicinity of the first opening OP1 and the second opening OP2, the partition wall 72 suppresses the conducting wire 32 (42) that is cut and exposed from coming into contact with the conducting wire 42 (32) in the second space S2.

As illustrated in FIG. 7, the first cable 30 is disposed along an outer peripheral path R1. The outer peripheral path R1 includes a path from the first space S1 to the second space S2 via the first opening OP1 and passes between the second wall 562 and the partition wall 70 and between the second wall 562 and the partition wall 72. The second cable 40 is disposed along an inner peripheral path R2. The inner peripheral path R2 includes a path from the first space S1 to the second space S2 via the second opening OP2 and passes between the partition wall 70 and the outer-circumferential cylindrical portion 140 and between the partition wall 72 and the outer-circumferential cylindrical portion 140. The inner peripheral path R2 is provided inward of the outer peripheral path R1 in the radial direction of the rotation axis AX. Thus, the first cable 30 and the second cable 40 are inserted into the first space S1 from the second space S2 at different positions (positions of the openings).

The partition wall 70 in the present embodiment is an example that realizes an insertion structure 700 in which the first cable 30 and the second cable 40 are inserted from the second space S2 to the first space S1 at positions different from each other. However, the insertion structure 700 may be realized by another configuration. For example, the insertion structure 700 may be realized by an elastic member (e.g., rubber) provided between the first cable 30 and the second cable 40.

Figure 8:
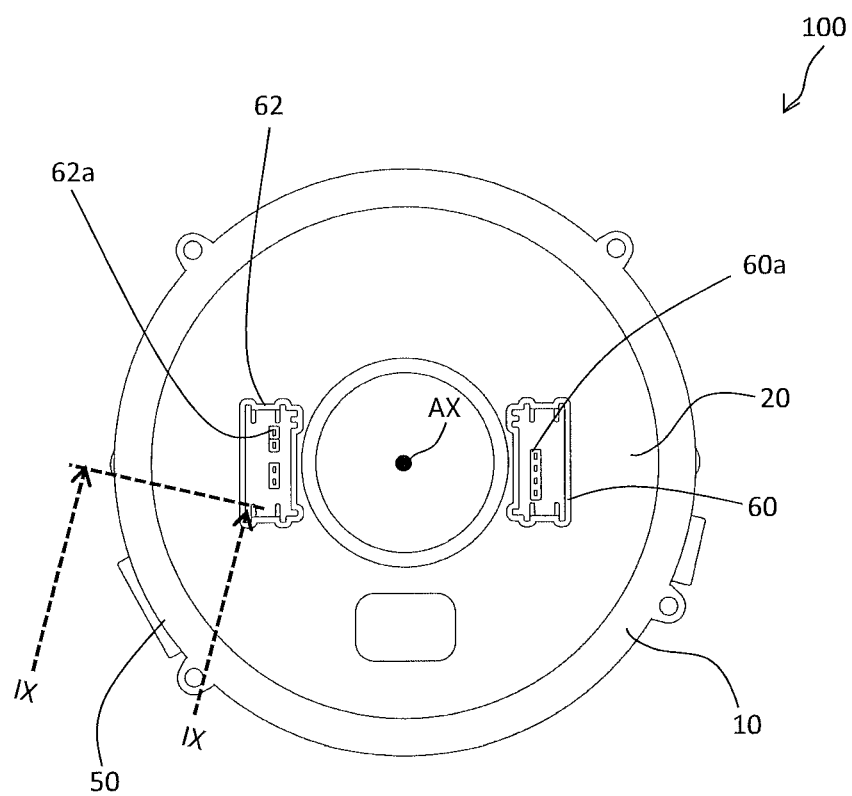
FIG. 8 is a top view of the rotary connector device.
Figure 9:
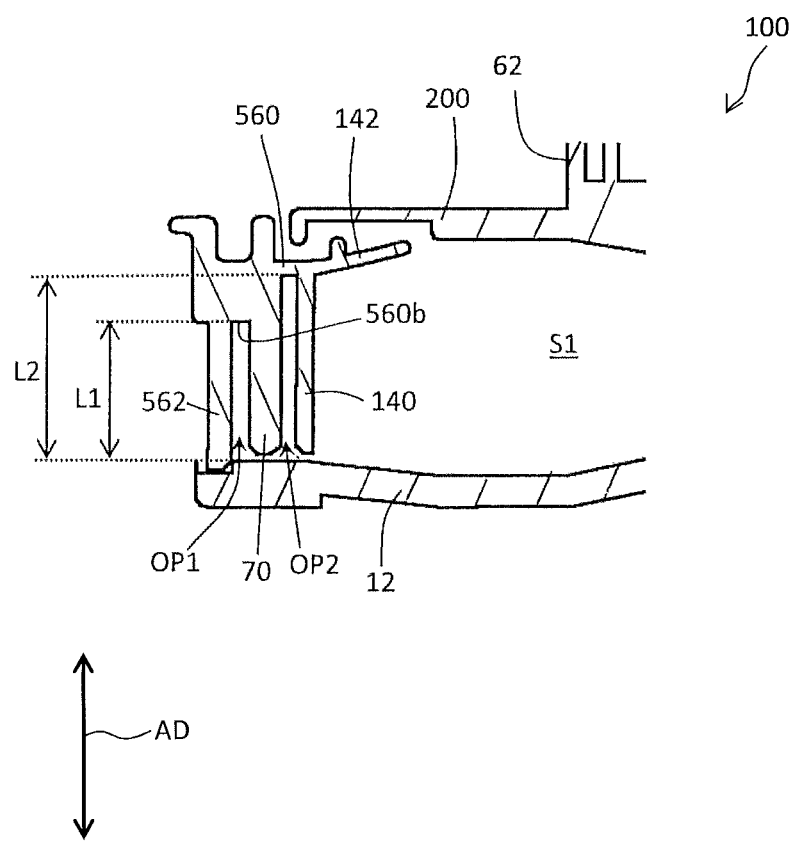
FIG. 9 is a cross-sectional view of the rotary connector device taken along a line IX-IX in FIG. 8.

FIG. 8 is a top view of the rotary connector device 100. FIG. 9 is a cross-sectional view of the rotary connector device 100 taken along a line IX-IX in FIG. 8. As illustrated in FIG. 9, a length L1 of the first opening OP1 in the axial direction AD is smaller than a length L2 of the second opening OP2 in the axial direction AD. Specifically, the length L1 is a length from the stepped portion 560b (see also FIG. 6) protruding downward from the first wall 560 to the first fixed body portion 12 in the axial direction AD. The length L2 is a length from the first wall 560 to the first fixed body portion 12 in the axial direction AD.

The length L1 is set based on the width W1 of the first cable 30. The length L2 is set based on the width W2 of the second cable 40. For example, the length L1 may range from 10% to 90% of the length L2. However, the length L1 and L2 may be substantially the same. In the present embodiment, the length L1 is smaller than the width W2 of the second cable 40. Accordingly, even when the second cable 40 passing through the large second opening OP2 is cut, the cut second cable 40 is less likely to enter the small first opening OP1. However, the length L1 may be substantially the same as the width W2 of the second cable 40 or may be larger than the width W2 of the second cable 40.

Figure 10:
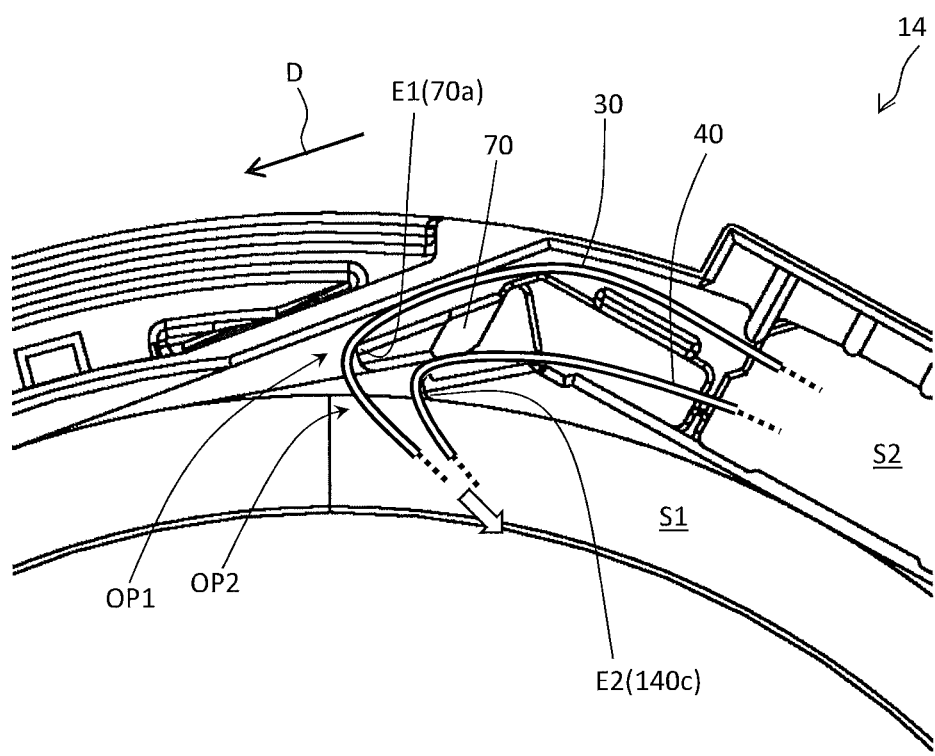
FIG. 10 is a plan view of the second fixed body portion for illustrating the first cable and the second cable in the rotary connector device in an excessive rotation state.

FIG. 10 is a plan view of the second fixed body portion 14 for illustrating the first cable 30 and the second cable 40 in the rotary connector device 100 in an excessive rotation state.

As described above, in the state where the first cable 30 and the second cable 40 are connected between the fixed body 10 and the rotation body 20, the rotation body 20 rotates about the rotation axis AX with respect to the fixed body 10. When the rotation body 20 rotates with respect to the fixed body 10 at a limited rotation angle (e.g., 720°) or more, the rotary connector device 100 is in an excessive rotation state. In the excessive rotation state of the rotary connector device 100, the first cable 30 and the second cable 40 may be pulled by an excessive tensile load and cut.

For example, when the rotation body 20 rotates with respect to the fixed body 10 by the limited rotation angle or more in the clockwise direction on the page surface of FIG. 10, the first cable 30 is folded at a first edge E1 of the first opening OP1. On the other hand, the second cable 40 is folded at a second edge E2 of the second opening OP2. However, the first edge E1 is composed of an end portion 70a (see also FIG. 6) of the partition wall 70 in the direction D in which the partition wall 70 extends. The second edge E2 is composed of an end portion 140c (see also FIG. 6) of the outer-circumferential cylindrical portion 140 in the circumferential direction of the rotation axis AX.

In the state illustrated in FIG. 10, when the rotation body 20 further rotates clockwise on the page surface of FIG. 10 with respect to the fixed body 10, the first cable 30 may be cut at the first edge E1. Similarly, the second cable 40 may be cut at the second edge E2. That is, the first cable 30 and the second cable 40 may be cut at different positions in the vicinity of the first opening OP1 and the second opening OP2.

In addition, even when the rotation body 20 rotates with respect to the fixed body 10 in the counterclockwise direction on the page surface of FIG. 10 by the limited rotation angle or more, the first cable 30 and the second cable 40 may be cut at different positions in the vicinity of the first opening OP1 and the second opening OP2 by the partition wall 70.

Summary of Configuration, Operation, and Effect of Embodiments

The connector 50 includes: the first opening OP1 that connects the second space S2 to the first space S1; and a second opening OP2 that is partitioned with the first opening OP1 and that connects the second space S2 to the first space S1. The first cable 30 is arranged such that the first cable 30 passes through the first opening OP1 and the other end 30b of the first cable 30 is connected to the rotation body 20. The second cable 40 is arranged such that the second cable 40 passes through the second opening OP2 and the other end 40b of the second cable 40 is connected to the rotation body 20.

According to this configuration, the first cable 30 and the second cable 40 are inserted into the first space S1 between the fixed body 10 and the rotation body 20 from different positions. Therefore, even when the first cable 30 is cut at the edge (e.g., the first edge E1) of the first opening OP1 due to excessive rotation of the rotary connector device 100, the conducting wire 32 exposed from the covering member 34 is suppressed from being short-circuited to the conducting wire 42 of the second cable 40 in the vicinity of the second opening OP2. Similarly, even when the second cable 40 is cut at the edge (e.g., the second edge E2) of the second opening OP2, the conducting wire 42 exposed from the covering member 44 is suppressed from being short-circuited to the conducting wire 32 of the first cable 30 in the vicinity of the first opening OP1. Even when both the first cable 30 and the second cable 40 are cut, the conducting wire 32 and the conducting wire 42 exposed by the cutting are suppressed from coming into contact with each other. Therefore, for example, unintended opening of the airbag due to the short-circuit between the conducting wire 32 and the conducting wire 42 is suppressed. The connector 50 also includes the partition wall 70 that partitions the second space S2 so as to form the first opening OP1 and the second opening OP2 and that extends in the axial direction AD of the rotation axis AX.

In this configuration, the position of the first opening OP1 and the position of the second opening OP2 are different from each other in the direction orthogonal to the axial direction AD. Therefore, even when at least one of the first cable 30 or the second cable 40 is cut, the partition wall 70 suppresses the first cable 30 and the second cable 40 from coming into contact with each other in the direction orthogonal to the axial direction AD, thereby preventing a short-circuit. However, the first opening OP1 and the second opening OP2 may be vertically partitioned in the axial direction AD. That is, the partition wall 70 may have a shape extending in a direction orthogonal to the rotation axis AX.

The partition wall 70 extends in the circumferential direction of the rotation axis AX in the second space S2.

According to this configuration, the first opening OP1 through which the first cable 30 passes and the second opening OP2 through which the second cable 40 passes extend in the circumferential direction in the second space S2. Therefore, the partition wall 70 more reliably suppresses the first cable 30 and the second cable 40 from coming into contact with each other in the vicinity of the first opening OP1 and the second opening OP2 in the second space S2, thereby preventing a short-circuit.

Further, the rotary connector device 100 includes the first cable 30 and the second cable 40 that are cut at the first edge E1 of the first opening OP1 and the second edge E2 of the second opening OP2, respectively, when the rotation body 20 rotates about the rotation axis AX by a limited rotation angle or more. The position of the first edge E1 in the circumferential direction of the rotation axis AX is different from the position of the second edge E2 in the circumferential direction of the rotation axis AX.

In this configuration, even when the first cable 30 and the second cable 40 are cut, they are cut at different positions, and thus the cut surface of the first cable 30 and the cut surface of the second cable 40 are located at different positions in the circumferential direction of the rotation axis AX. Therefore, short-circuit between the cut surfaces is suppressed.

The length L1 of the first opening OP1 in the axial direction AD of the rotation axis AX is smaller than the length L2 of the second opening OP2 in the axial direction AD.

Accordingly, even when the second cable 40 is cut and the conducting wire 42 is exposed from the covering member 44, the exposed conducting wire 42 is less likely to enter the first opening OP1.

It should be noted that, in the present application, "comprise" and its derivatives are non-limiting terms describing the presence of a component and do not exclude the presence of other components not described. This also applies to "have", "include" and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

The expression "at least one of A or B" in the present disclosure includes any of the following three cases. (i) includes only A, (ii) includes only B, and (iii) includes both A and B.

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A rotary connector device comprising:
   a fixed body;
   a rotation body rotatable about a rotation axis with respect to the fixed body, the rotation body being assembled to the fixed body in a manner to form a first space between the rotation body and the fixed body; and
   a connector coupled to the fixed body and including a second space, the connector comprising:
      a first opening connecting the second space to the first space; and
      a second opening partitioned with the first opening, the second opening connecting the second space to the first space,
      one end of a first cable being connected to a first electrode provided in the second space of the connector,
      one end of a second cable being connected to a second electrode provided in the second space of the connector,
      the first cable passing through the first opening, the other end of the first cable being connected to the rotation body, and
      the second cable passing through the second opening, the other end of the second cable being connected to the rotation body.

2. The rotary connector device according to claim 1, wherein
   the connector comprises a partition wall that partitions the second space in a manner to form the first opening and the second opening and that extends in an axial direction of the rotation axis.

3. The rotary connector device according to claim 2, wherein
   the partition wall extends in a circumferential direction of the rotation axis in the second space.

4. The rotary connector device according to claim 1, comprising:
   the first cable arranged to be folded at a first edge of the first opening when the rotation body rotates about the rotation axis by a limited rotation angle or more; and
   the second cable arranged to be folded at a second edge of the second opening when the rotation body rotates about the rotation axis by a limited rotation angle or more, wherein
   a position of the first edge in a circumferential direction of the rotation axis and a position of the second edge in the circumferential direction are different from each other.

5. The rotary connector device according to claim 4, wherein
   the first cable is arranged to be cut after folded at the first edge of the first opening when the rotation body rotates around the rotation axis by the limited rotation angle or more, and
   the second cable is arranged to be cut after folded at the second edge of the second opening when the rotation body rotates around the rotation axis by the limited rotation angle or more.

6. The rotary connector device according to claim 1, wherein
   a length of the first opening in an axial direction of the rotation axis is smaller than a length of the second opening in the axial direction.

* * * * *